United States Patent [19]
Brown et al.

[11] Patent Number: 5,716,582
[45] Date of Patent: Feb. 10, 1998

[54] METHOD OF AND APPARATUS FOR EJECTION OF MOLDED PRODUCT FROM MOLD PARTS

[75] Inventors: Paul Philip Brown, Carlsbad, Calif.; Jens Ole Sorensen, Cayman Kai, Cayman Islands

[73] Assignee: Universal Ventures, Cayman Islands

[21] Appl. No.: 650,194

[22] Filed: May 20, 1996

[51] Int. Cl.⁶ .................................................. B29C 45/40
[52] U.S. Cl. ...................... 264/571; 264/334; 425/556; 425/577
[58] Field of Search ...................... 425/556, 577; 264/335, 336, 334, 571

[56] References Cited

U.S. PATENT DOCUMENTS

| | | | |
|---|---|---|---|
| 4,856,977 | 8/1989 | Von Holdt | 425/577 |
| 5,244,606 | 9/1993 | Maus et al. | 425/556 |

Primary Examiner—Tim Heitbrink
Attorney, Agent, or Firm—Edward W. Callan

[57] ABSTRACT

During operation of a molding apparatus that combines a cavity part having a plurality of cavity sections and a core part having a plurality of cores to define a plurality of mold cavities therebetween, when the cavity part and the core part are first separated from one another following formation of products in the mold cavities, force is applied to the products in order to retain the products in the cavity part. While the cavity part and the core part are being further separated from one another the products are moved from the cavity part to the core part; and the products are ejected from the core part when the cavity part and the core part are still further separated from one another. Alternatively, the products are ejected from the cavity part.

21 Claims, 4 Drawing Sheets

# METHOD OF AND APPARATUS FOR EJECTION OF MOLDED PRODUCT FROM MOLD PARTS

BACKGROUND OF THE INVENTION

The present invention generally pertains to ejection of molded products from the parts in which the product is formed and is particularly directed to an improved apparatus and method for effecting such removal.

A typical molding apparatus includes a cavity part having at least one cavity section; a core part having at least one core for combination with the cavity part to define at least one mold cavity therebetween; means for separating the cavity part and the core part from one another; and means for ejecting a product formed in the mold cavity while the cavity part and the core part are being separated from one another. When such a mold is operated at a high speed for molding products having a hollow component, such as cups, made of a plastic material such as polypropylene, the molded product tends to adhere to both mold parts when the mold parts are separated, whereby sometimes the product is not retained in the mold part that is particularly adapted for ejection of the product therefrom.

SUMMARY OF THE INVENTION

The present invention provides an apparatus and method that enable consistent ejection of a molded product from the same mold part when operated at high speed with a plastic material that tends to adhere to both mold parts when the mold parts are separated.

The molding apparatus of the present invention comprises a cavity part having at least one cavity section; a core part having at least one core for combination with the cavity part to define at least one mold cavity therebetween; first means for separating the cavity part and the core part from one another; second means for forcing the product to be retained in the cavity part when the cavity part and the core part are first separated from one another; and third means for ejecting the product from the cavity part when the cavity part and the core part are further separated from one another.

The molding method of the present invention comprises the steps of:

(a) combining a cavity part having at least one cavity section with a core part having at least one core to define at least one mold cavity therebetween;

(b) forming a product in the at least one mold cavity;

(c) after step (b), separating the cavity part and the core part from one another;

(d) during step (c), forcing the product to be retained in the cavity part when the cavity part and the core part are first separated from one another; and (e) after step (d), ejecting the product from the cavity part when the cavity part and the core part are further separated from one another.

Additional features of the present invention are described with reference to the detailed description of the preferred embodiments.

DETAILED DESCRIPTION

Figure 3:
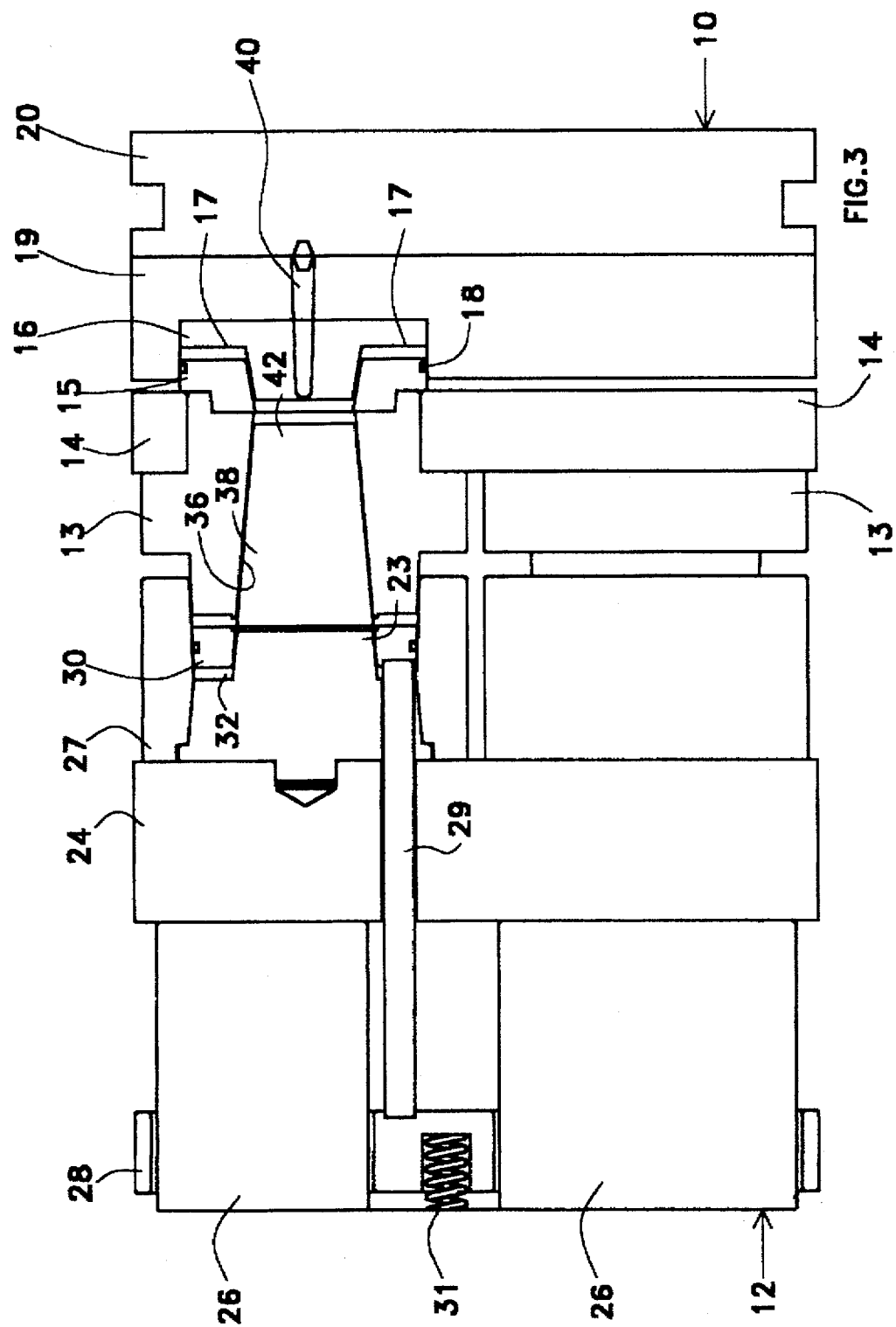
FIG. 3 is a plan view of the apparatus as in FIG. 1 when the cavity part and the core part are further separated from one another.
Figure 4:
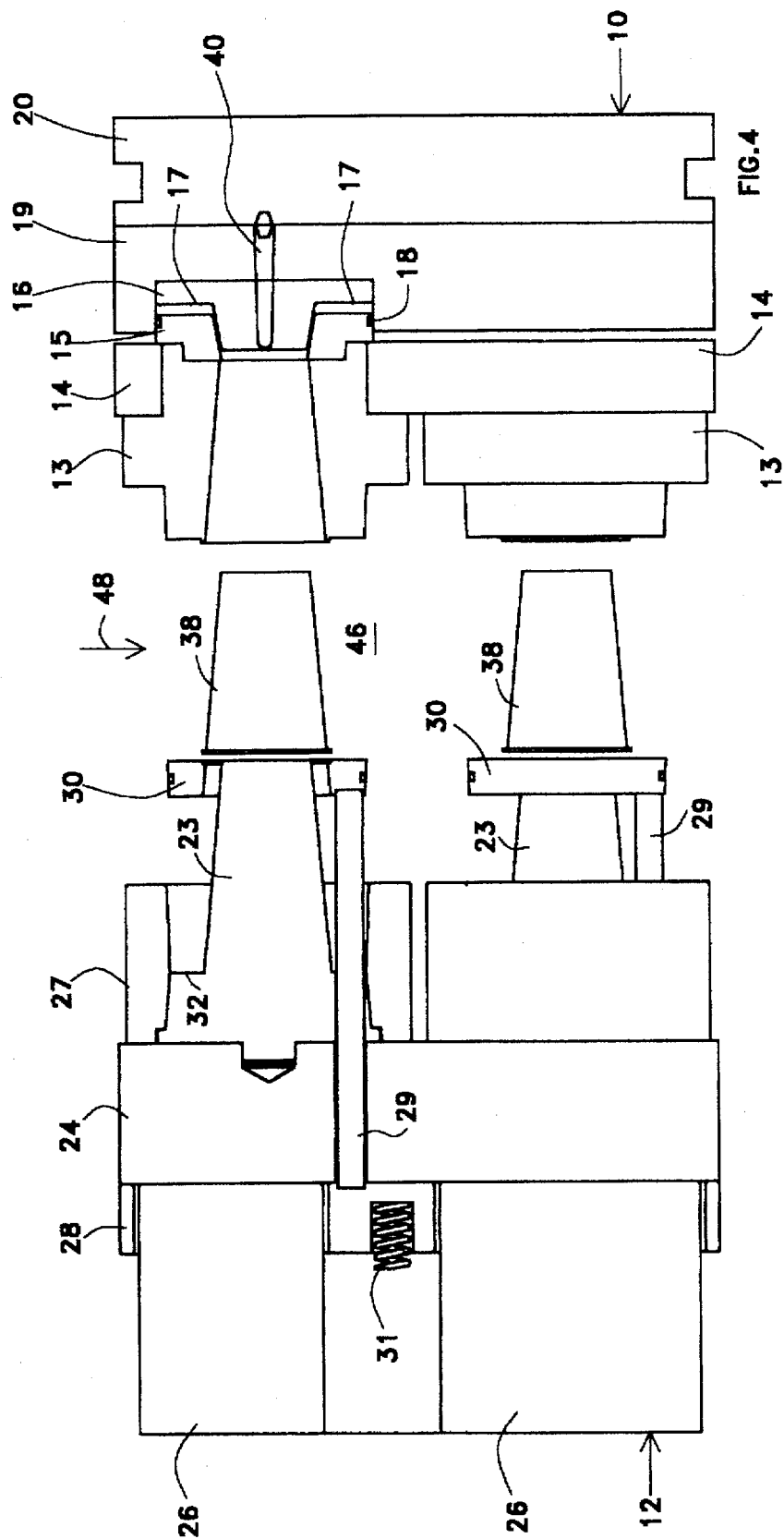
FIG. 4 is a plan view of the apparatus as in FIG. 1 illustrating ejection of the products from the core parts when the cavity part and the core part are still further separated from one another.

As best seen in FIGS. 3 and 4, a preferred embodiment of the apparatus of the present invention includes a cavity part 10 and a core part 12.

The cavity part 10 includes a plurality of cavity sections 13, a cavity plate 14, a plurality of cavity wear rings 15, a plurality of gate inserts 16, a first plurality of compressed air sources 17, a plurality of O-rings 18, a first runner plate 19 and a second runner plate 20.

The core part 12 includes a plurality of cores 23, a core plate 24, core support pillars 26, a plurality of locking rings 27, an ejector plate 28, a plurality of ejector rods 29, a plurality of stripper rings 30 a plurality of springs 31 and a second plurality of compressed air sources 32. The springs 31 are disposed between a movable machine platen (not shown) and the ejector plate 28 and exerts force though the ejector rods 29 to the stripper rings 30.

Figure 1:
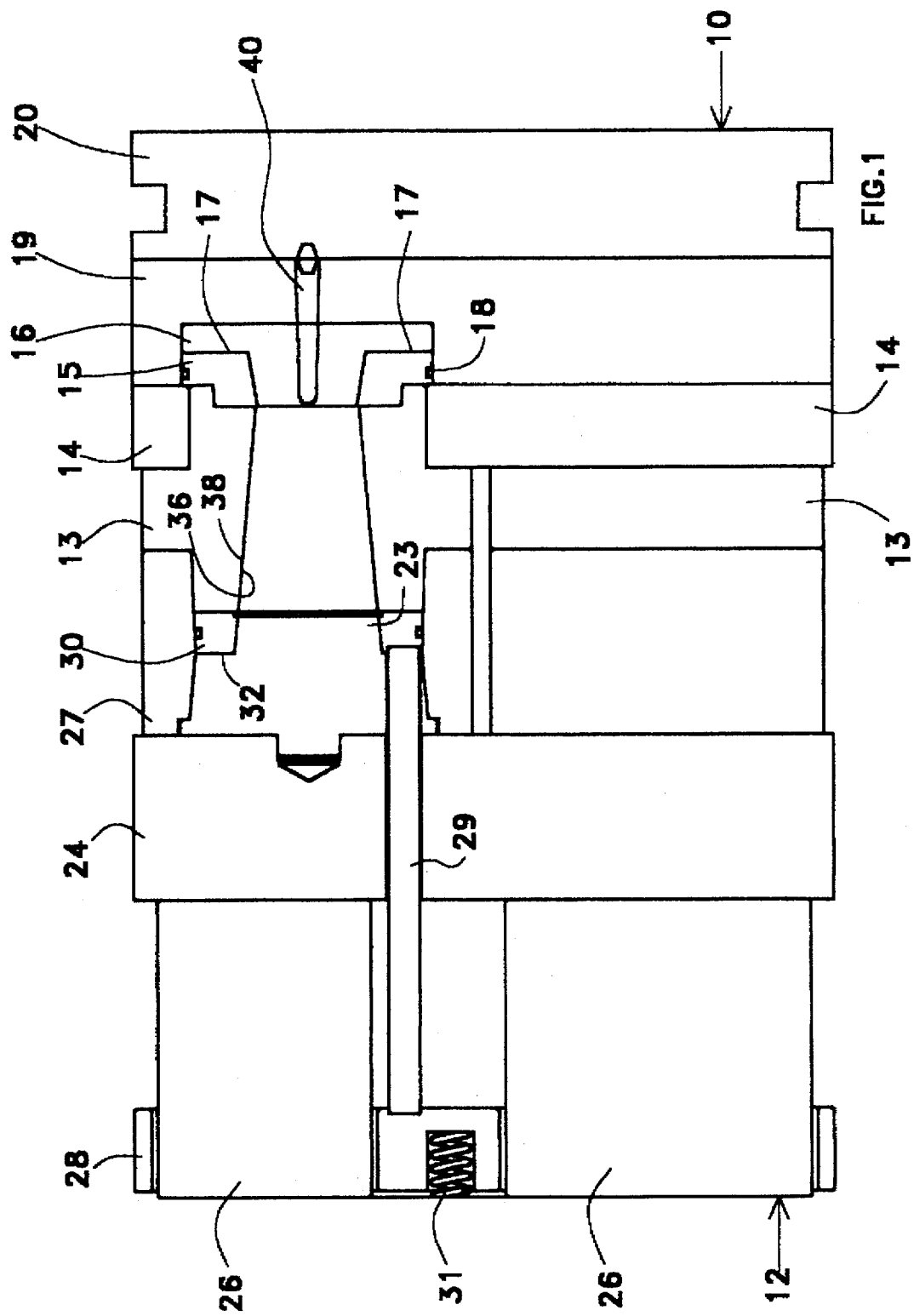
FIG. 1 is a plan view of a preferred embodiment of the apparatus of the present invention with portions of thereof broken away to illustrate certain interior components and the operation of said apparatus. The view of FIG. 1 shows the apparatus before the cavity part and the core part are first separated from one another.

When the cavity part 10 is combined with the core part 12 as shown in FIG. 1, a plurality of mold cavities 36 are defined respectively between the plurality of cavity sections 13 and the plurality of gate inserts 16 in the cavity part 10 and the plurality of cores 23 in the core part 12. In the preferred embodiment the mold cavities 36 are defined for forming hollow plastic products 38, such as cups.

Plastic material such as polypropylene is injected into the mold cavities 36 through a runner system 40, which extends between the first runner plate 19 and the second runner plate 20 and passes through the gate inserts 16 to the mold cavities 36. The injected plastic material solidifies in the mold cavities 36 to form a plurality of molded products 38.

The cavity part 10 and the core part 12 are then separated from one another by hydraulic means (not shown).

Figure 2:
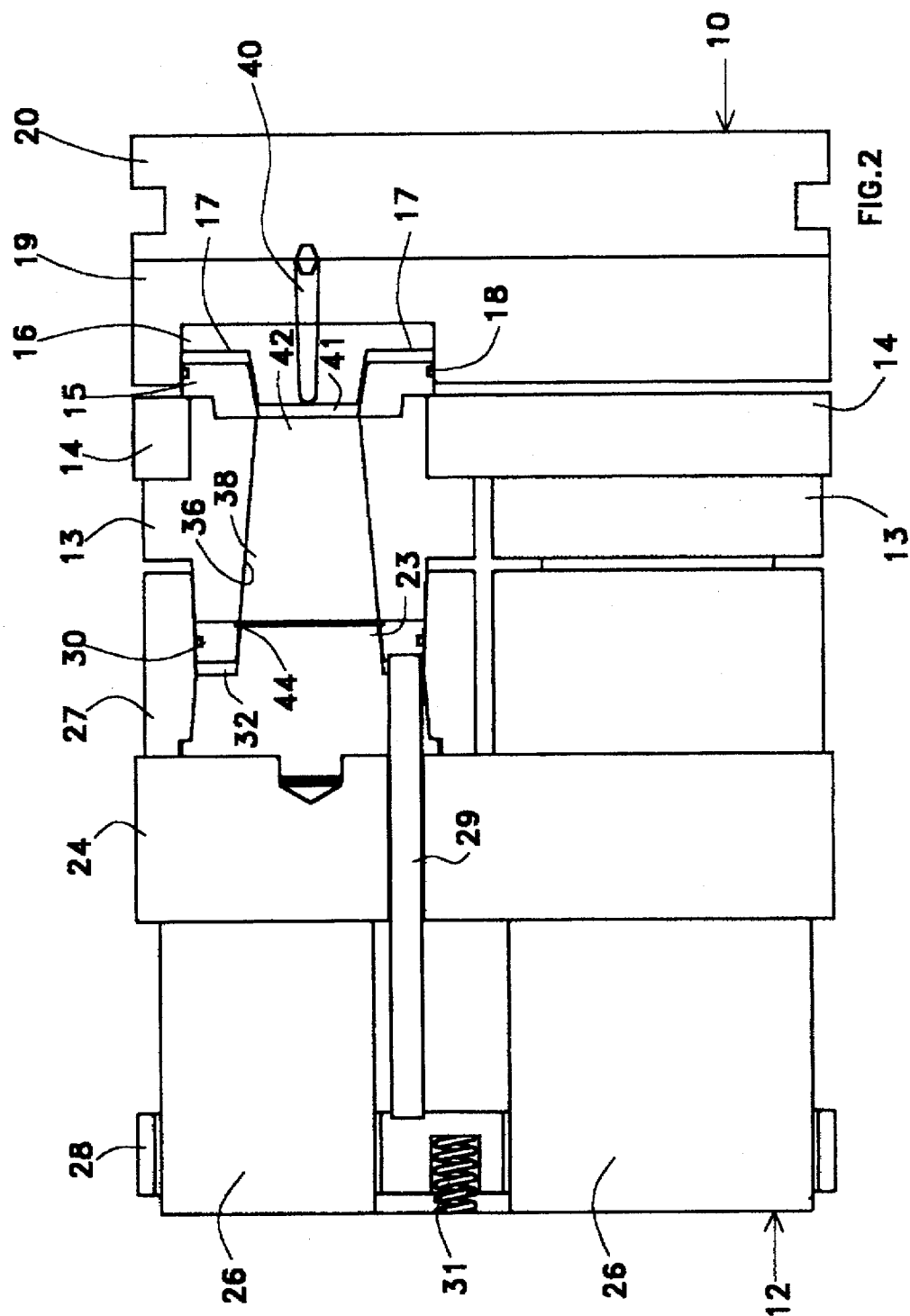
FIG. 2 is a plan view of the apparatus as in FIG. 1 when the cavity part and the core part are first separated from one another.

Referring to FIG. 2, when the cavity part 10 and the core part 12 are first separated from one another and while they are moving away from one another through a very small distance of approximately two millimeters, the cavity wear rings 15 and the gate inserts 16 are slightly separated from one another and such separation in combination with air seals provided by the O-rings 18 respectively create a less-than-ambient air pressure in spaces 41 adjacent one end 42 of the molded products 38 to thereby create at least a partial vacuum between the molded products 38 and the cavity sections 13 so as to enhance the adherence of the molded products 38 to the cavity sections 13; and a combination of compressed air imparted against the opposite end 44 of the molded products 38 by the second plurality of compressed air sources 32 and pressure from the springs 31 exerted against the opposite end 44 of the molded products 38 through the ejector plate 28, the ejector rods 29 and the stripper rings 30 pushes the molded products 38 from the cores 23 and combines with the adherence of the molded products 38 to the cavity part 10 to overcome the adherence of the molded products 38 to the cores 23 and force the molded products 38 to be retained in the cavity part 10 so that all of the molded products 38 are consistently retained in the cavity part 10 during the initial stage of the separation of the cavity part 10 and the core part 12 from one another.

As the cavity part 10 and the core part 12 continue to be further separated from one another beyond the aforementioned separation distance of approximately two millimeters, the second plurality of compressed air sources 32 may or may not cease to impart compressed air against the opposite end 44 of the molded products 38 and the first plurality of compressed air sources 17 commence to impart compressed air against the one end 42 of the molded products 38 to thereby move the molded products from the cavity part 10 to the core part 12, as shown in FIG. 3.

When the cavity part 10 and the core part 12 have been still further separated from one another, as shown in FIG. 4, the ejector plate 28 is further protracted to move toward the opening 46 between the cavity part 10 and the core part 12 in response to the force applied thereto by a machine hydraulic ejection cylinder (not shown) such that the stripper rings 30 move rapidly to push the molded products 38 from the cores 23 and thereby eject the molded products from the core part 12 and into the space 46 between the cavity part 10 and the core part 12, as shown in FIG. 4. The ejected molded products 38 are blown away from the space 46 between the cavity part 10 and the core part 12 by a stream of compressed air 48 from another source of compressed air (not shown).

In an alternative embodiment (not shown), the molded products 38 are ejected from the cavity part 10 when the mold parts are fully separated, instead of being moved from the cavity part 10 to the core part 12 and then being ejected from the core part 12 as described above with reference to FIGS. 3 and 4.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A molding method, comprising the steps of:
   (a) combining a cavity part having at least one cavity section with a core part having at least one core to define at least one mold cavity therebetween;
   (b) forming a product in the at least one mold cavity;
   (c) after step (b), separating the cavity part and the core part from one another;
   (d) during step (c), forcing the product to be retained in the cavity part when the cavity part and the core part are first separated from one another; and
   (e) after step (d), ejecting the product from the cavity part when the cavity part and the core part are further separated from one another.

2. An method according to claim 1, wherein step (d) comprises the step of:
   (f) imparting compressed air against the product to retain the product in the cavity part.

3. An method according to claim 2, wherein step (d) further comprises the step of:
   (g) pushing the product from the core part.

4. An method according to claim 3, wherein step (d) further comprises the step of:
   (h) creating at least a partial vacuum between the product and the at least one cavity section.

5. An method according to claim 2, wherein step (d) further comprises the step of:
   (g) creating at least a partial vacuum between the product and the at least one cavity section.

6. An method according to claim 1, wherein step (d) comprises the step of:
   (g) pushing the product from the core part.

7. An method according to claim 6, wherein step (d) further comprises the step of:
   (g) creating at least a partial vacuum between the product and the at least one cavity section.

8. An method according to claim 1, wherein step (d) comprises the step of:
   (f) creating at least a partial vacuum between the product and the at least one cavity section.

9. An method according to claim 1, wherein step (e) comprises the step of:
   (f) imparting compressed air against the product to eject the product from the cavity part.

10. An method according to claim 1, wherein step (e) comprises the step of
    (f) moving the product from the cavity part to the core part while the cavity part and the core part are being further separated from one another; and the method further includes the step of:
    (g) ejecting the product from the core part when the cavity part and the core part are further separated from one another.

11. A molding apparatus, comprising
    a cavity part having at least one cavity section;
    a core part having at least one core for combination with the cavity part to define at least one mold cavity therebetween;
    first means for separating the cavity part and the core part from one another;
    second means for forcing the product to be retained in the cavity part when the cavity part and the core part are first separated from one another; and
    third means for ejecting the product from the cavity part when the cavity part and the core part are further separated from one another.

12. An apparatus according to claim 11, wherein the second means comprise means for imparting compressed air against the product.

13. An apparatus according to claim 12, wherein the second means further comprise means for pushing the product from the core part.

14. An apparatus according to claim 13, wherein the second means further comprise means for creating at least a partial vacuum between the product and the at least one cavity section.

15. An apparatus according to claim 12, wherein the second means further comprise means for creating at least a partial vacuum between the product and the at least one cavity section.

16. An apparatus according to claim 11, wherein the second means comprise means for pushing the product from the core part.

17. An apparatus according to claim 16, wherein the pushing means comprise a spring.

18. An apparatus according to claim 16, wherein the second means further comprise means for creating at least a partial vacuum between the product and the at least one cavity section.

19. An apparatus according to claim 11, wherein the second means comprise means for creating at least a partial vacuum between the product and the at least one cavity section.

20. An apparatus according to claim 11, wherein the third means comprise means for imparting compressed air against the product.

21. An apparatus according to claim 11, wherein the third means are adapted for moving the product from the cavity part to the core part while the cavity part and the core part are being further separated from one another; and the system includes fourth means for ejecting the product from the core part when the cavity part and the core part are further separated from one another.

* * * * *